US008412806B2

(12) United States Patent
Schneider

(10) Patent No.: US 8,412,806 B2
(45) Date of Patent: *Apr. 2, 2013

(54) SETTING A PRELIMINARY TIME ON A NETWORK APPLIANCE USING A MESSAGE RECEIVED FROM A SERVER

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/985,464

(22) Filed: Nov. 14, 2007

(65) Prior Publication Data

US 2009/0144399 A1 Jun. 4, 2009

(51) Int. Cl.
*G06F 15/177* (2006.01)
*G06F 15/16* (2006.01)
*H04L 29/06* (2006.01)

(52) U.S. Cl. ............ 709/221; 709/220; 709/225; 726/2; 726/3; 726/5; 726/10

(58) Field of Classification Search .................. 713/155, 713/156; 709/220, 221, 222; 726/2, 3, 5, 726/6, 7, 8, 9, 10
See application file for complete search history.

(56) References Cited

U.S. PATENT DOCUMENTS

| 6,940,979 | B1 | 9/2005 | Bobbitt | |
|---|---|---|---|---|
| 7,392,377 | B2 * | 6/2008 | Ogg et al. | 713/153 |
| 7,409,557 | B2 * | 8/2008 | Teppler | 713/178 |
| 8,196,192 | B2 | 6/2012 | Schneider | |
| 2002/0128925 | A1 * | 9/2002 | Angeles | 705/26 |
| 2002/0178354 | A1 * | 11/2002 | Ogg et al. | 713/155 |
| 2005/0076204 | A1 * | 4/2005 | Thornton et al. | 713/156 |
| 2005/0138426 | A1 * | 6/2005 | Styslinger | 713/201 |
| 2005/0160272 | A1 * | 7/2005 | Teppler | 713/178 |
| 2006/0080536 | A1 * | 4/2006 | Teppler | 713/176 |
| 2006/0156011 | A1 * | 7/2006 | Masui | 713/178 |
| 2007/0192325 | A1 * | 8/2007 | Morris | 707/10 |
| 2007/0288247 | A1 * | 12/2007 | Mackay | 705/1 |
| 2008/0082662 | A1 * | 4/2008 | Dandliker et al. | 709/225 |
| 2008/0307508 | A1 * | 12/2008 | Conley et al. | 726/4 |
| 2009/0100512 | A1 * | 4/2009 | Schneider | 726/10 |

OTHER PUBLICATIONS

Mills, David L., "Network Time Protocol (Version 3) Specification, Implementation and Analysis," Network Working Group, Request for Comments: 1305, Obsoletes: RFC-1119, RFC-1059, RFC-958, University of Delaware, Mar. 1992, 120 pages.
Red Hat Office Action for U.S. Appl. No. 11/974,713 (P298) mailed Dec. 28, 2010.
Office Action for U.S. Appl. No. 11/974,713, mailed Aug. 17, 2011.
Notice of Allowancefor U.S. Appl. No. 11/974,713, mailed Feb. 3, 2012.

* cited by examiner

*Primary Examiner* — Tae Kim

(74) *Attorney, Agent, or Firm* — Lowenstein Sandler LLP

(57) ABSTRACT

A method and system for setting a time on a network appliance. The method may include attempting to establish a secure connection with a backend server using a certificate issued for a network appliance, and determining that an attempt to establish a secure connection has failed. The method may further include soliciting a response from one or more predefined servers, extracting time data from one or more responses received from the predefined server, and updating the time on the network appliance using the time data extracted from the received responses.

23 Claims, 6 Drawing Sheets

SETTING A PRELIMINARY TIME ON A NETWORK APPLIANCE USING A MESSAGE RECEIVED FROM A SERVER

TECHNICAL FIELD

Embodiments of the present invention relate to network appliances, and more specifically to setting a preliminary time on a network appliance using a message received from a server.

BACKGROUND

A network appliance may be a computing device (e.g., a desktop computer, laptop computer, a router, etc.) that communicates with a server via a network. To ensure privacy and security during communication between the network appliance and the server, authentication and verification mechanisms may be used. One such mechanism is known as a public key infrastructure system.

In a public key infrastructure system, a network appliance may send a certificate signing request (CSR) to a certificate authority in order to apply for a signed identity certificate. Before creating a CSR, the network appliance may first generate a key pair (including a public key and a private key), keeping the private key secret. The CSR may contain information identifying the network appliance (e.g., its distinguished name in the case of an X.509 certificate), and the public key generated by the network appliance. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may then used by the network appliance to authenticate itself to the server and other networked devices that trust the certificate authority.

A network appliance may perform various functions (e.g., monitoring network characteristics, monitoring devices on the network, indexing local network resources, etc.) that depend on the network appliance having an accurate time base. Initial time data may be provided to the network appliance via designated time servers. For systems using secure communication, time servers may only be accessible behind an https proxy that requires client certificate authentication. The client certificate authentication will not be successful when the time of the network appliance is too far in the past, which may happen if, for example, the hardware clock of the network appliance has failed, the on-board battery that keeps the clock of the network appliance running during shutdown is dead, etc. If the authentication fails, the network appliance will not be able to obtain accurate time data from the time server. As a result, the network appliance will not function properly until an operator intervenes and resets the time on the network appliance.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
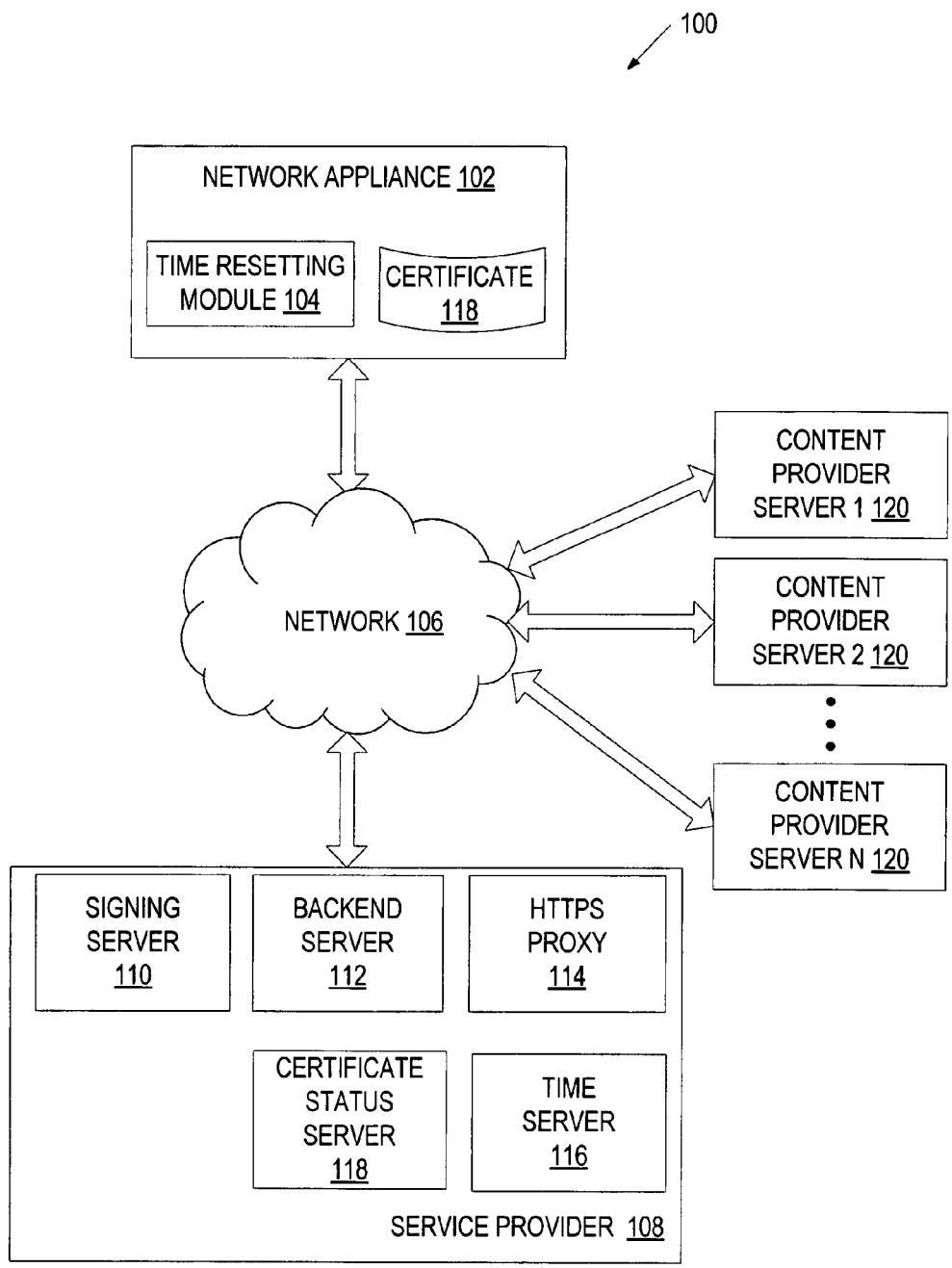
FIG. 1 illustrates an exemplary network architecture in which embodiments of the invention may operate.

Described herein is a method and system for setting time on a network appliance using a message received from a server. In one embodiment, a network appliance attempts to establish a secure connection with a server using a certificate issued for the network appliance, and determines that its attempt to establish the secure connection has failed. Next, the network appliance solicits a response from one or more predefined servers, extracts time data from the response(s) received from the predefined server(s), and updates the time on the network appliance using the time data extracted from the received response(s). After setting the preliminary time, the network appliance can request an exact time from a time server.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium (e.g., a computer-readable medium) includes any mechanism for storing or transmitting information in a form readable by a machine (e.g., a computer). For example, a machine-readable medium (e.g., computer-readable medium) includes a machine (e.g., computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include a service provider 108 connected with a network appliance 102 via a network 106 (e.g., a public network such as Internet or a private network such as Intranet or a virtual private network (VPN)). The network appliance 102 may be part of a customer network (e.g., a local area network (LAN), wide area network (WAN), etc.) that may be a network of an enterprise and may include such devices as desktop computers, laptop computers, network printers, switches, routers, gateways, firewalls, or any other devices having a network address. The network appliance 102 may be a computing device (e.g., a desktop computer, a laptop computer, a router, etc.) that is configured to perform a network related function such as monitoring of the customer network, collecting operational characteristics of devices on the customer network, etc. The network appliance 102 may also be able to access content provider servers 210 via a wide area network (e.g., Internet).

The service provider 108 may receive information provided by the network appliance 102, analyze this information, and provide alerts and various reports to an administrator of the customer network. Alternatively, the network appliance 102 may collect other types of data, and the service provider 140 may use the network appliance 102 to provide other services, such as banking, database management, etc. Yet alternatively, the network appliance 102 may be configured to perform indexing of local network resources, and the service provider 108 may receive index data from the network appliance, store the index data in a data store and/or use the index data for the operation of its search engine.

In one embodiment, the functionality of the network appliance 102 is automatically activated upon completion of a provisioning process. The provisioning process may include obtaining an identity certificate (also known as a digital certificate, signed certificate, public key certificate, client x.509 certificate, etc.) for the network appliance 102 and configuring the network appliance 102 based on configuration information provided by the service provider 108.

The identity certificate may be obtained by generating a certificate signing request (CSR), sending the CSR to a certificate authority, and receiving a valid identity certificate from the certificate authority. The CSR may be generated using a public key pair (a public key and a private key) generated by the network appliance 102. In particular, the CSR may include the public key bundled with additional information such as credentials and information identifying the network appliance 102, with the bundle being signed by the private key.

In one embodiment, the service provider 108 hosts a signing server 110 that represents a certificate authority. The signing server 110 determines whether the CSR received from the network appliance 102 should be signed (e.g., if the credentials and the identifying information are satisfactory). If so, the signing server 110 signs the CSR with its private key, and sends the resulting identity certificate 118 to the network appliance 102.

The network appliance 102 stores the identity certificate 118 in a local data store to use it for secure communication with the service provider 108 and other entities that trust the signing server 110. In particular, the network appliance 102 may use the identity certificate 118 to establish a secure connection with the service provider 108 for receiving configuration information from the service provider 108.

The service provider 108 may host a back-end server 112 responsible for providing the configuration information and for exchanging other data with the network appliance 102. The back-end server 112 may communicate with the network appliance 102 directly or via an https proxy (e.g., an https proxy 114). Before accepting a secure connection with the network appliance 102, the back-end server 112 or the https proxy authenticates the network appliance 102 to verify its identity. In particular, the back-end server 112 or the https proxy determines whether a certificate is required and if so, whether the certificate 118 provided by the network appliance 102 is valid (e.g., was issued to the requester of the secure connection, has not been revoked, has not expired, etc.). The certificate 118 may not be provided by the network appliance 102 if the network appliance 102 determines that its current time is outside of a valid time window as defined by the time included in the certificate 118. If the time of the network appliance 102 is too far in the past, the certificate 118 will not be provided, causing the back-end server 112 or the https proxy to fail the authentication of the network appliance 102. The time of the network appliance 102 may be too far in the past, if for example, the hardware clock of the network appliance 102 has failed, the on-board battery that keeps the clock of the network appliance 102 running during shutdown is dead, etc. Even if the certificate 118 is provided, the back-end server 112 or the https proxy may still fail the authentication if the certificate 118 provided by the network appliance 102 is invalid.

In one embodiment, the network appliance 102 hosts a time resetting module 104 that is responsible for correcting the time of the network appliance 102 when its time is too far in the past. One solution would be to use time server(s) 116 maintained by the service provider 106 to provide accurate time. However, in secure communication systems, the time server 116 may only be accessible via the https proxy 114. As discussed above, the https proxy 114 requires certificate authentication that will not be successful if the time of the network appliance 102 is too far in the past. Hence, the time resetting module 104 first sets the time of the network appliance 102 to a preliminary time value that is close to the actual time, and then obtains the exact time from the time server 116.

In particular, when the time resetting module 104 is notified that an attempt to establish a secure connection with the service provider 108 (or any other entity trusting the signing server 110) has failed, the time resetting module 104 solicits a response from one or more predefined servers, extracts time data from the header of a received response(s), and updates the time of the network appliance using the extracted time data. In one embodiment, the time resetting module 104 performs the above operations by sending a request for a certificate status to a certificate status server 118 of the service provider 108. The time resetting module 104 may communicate with the certificate status server 118 directly or via the https proxy 114. In response to the request, the certificate status server 118 sends a response indicating whether the certificate is valid. If so, the resetting module 104 extracts time data from the header of the response (e.g., a web application response) and uses this time data to correct the time of network appliance.

In another embodiment, the time resetting module 104 uses predefined content provider servers (e.g., Yahoo!®, Google®, eBay®, etc.) to obtain the time. In particular, the time resetting module 104 sends a request (e.g., an http HEAD request) to each content provider server, extracts time data from the header of each response received from the content provider servers, calculates an average time value based on the extracted time data, and updates the time of the network appliance using the calculated time value.

Next, the time resetting module 104 obtains an accurate time value from the time server 116 and resets the time of the network appliance 102 using the time value received from the time server 116. Even though the preliminary time may not be exactly accurate, it should be close enough to allow successful authentication of the network appliance 102 by the https server 114. Alternatively, if the authentication fails because the preliminary time is still too far in the past, the time resetting module 104 adjusts the preliminary time by incrementing it by a predefined interval.

It should be noted that the servers 110 through 118 may share the same machine or be hosted by two or more independent machines. In addition, any of the servers 110 through 118 may reside externally to the service provider 108.

Figure 2A:
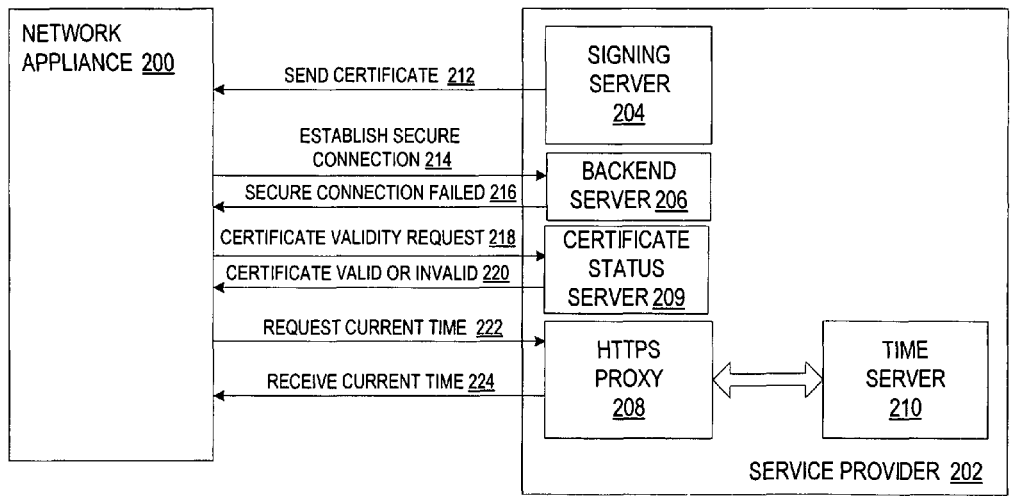
FIGS. 2A and 2B illustrate exemplary data flow diagrams that show data transmissions associated with a network appliance, in accordance with some embodiments of the invention.
Figure 2B:
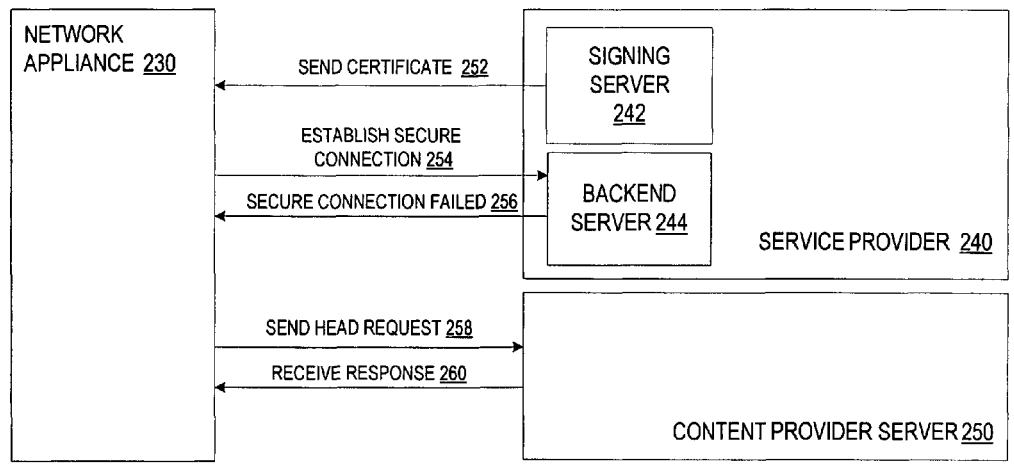

FIGS. 2A and 2B illustrate exemplary data flow diagrams that show data transmissions associated with a network appliance. Referring to FIG. 2A, a data flow diagram shows data transmitted between a network appliance 200 and a service provider 202, in accordance with one embodiment of the present invention. Preferably, each transmission is achieved using a secure channel such as, for example, secure sockets layer (SSL), secure hypertext transfer protocol (HTTPS), etc. Alternatively, an unsecure channel may be used for transmission of, for example, an identity certificate.

In a first transmission 212, a signing server 204 of the service provider 202 sends an identity certificate to the network appliance 200. The network appliance 200 stores the identity certificate locally and initiates a second transmission 214 to establish a secure connection with a back-end server 206 of the service provider 202 to obtain configuration information from the back-end server 206. The back-end server 206 may be accessible directly or via an https proxy (e.g., https proxy 208 or some other designated proxy). The back-end server 206 or the https proxy authenticates the network appliance 200 using its certificate.

If the authentication fails, the network appliance 200 is notified about the failure via an error response 216. The network appliance 200 then determines a possible cause of the failure. In one embodiment, the network appliance 200 sends a fourth transmission 218 to a certificate status server 209 to inquire whether the certificate is valid (e.g., has not been revoked). The certificate status server 209 may be accessible directly or via an https proxy (e.g., https proxy 208 or some other designated proxy). The transmission 218 may be enabled via a separate SSL channel or an unsecure channel. A fifth transmission 220 from the certificate status server 209 notifies the network appliance 200 whether the certificate is valid or not. If so, the network appliance 200 extracts time data from the header of the response and compares the time of the network appliance 200 with the extracted time data. If the difference between the two times is significant (e.g., exceeds a predefined threshold), the network appliance 200 resets its time using the time data extracted from the header of the response, and initiates a next transmission 222 to request exact time from a time server 210 of the service provider 202.

The https proxy 208 receives the transmission 208 and performs authentication of the network appliance's certificate. If the authentication is successful, the https proxy 208 passes the request for the current time to the time server 210 and returns the current time to the network appliance 200 via a transmission 224. If the authentication is not successful, the https proxy 208 notifies the network appliance 200, which then adjusts its time (e.g., by incrementing it by a predefined interval), and resubmits the request to the time server 210. Once the network appliance 200 receives the current time provided by the time server 210, the network appliance 200 resets its time to the current time and resubmits the transmission 214.

It should be noted that transmissions 214 through 224 may be repeated each time the network appliance 200 attempts to establish a secure connection with the service provider 202 or any other entity that trusts the signing server 204.

Referring to FIG. 2B, a data flow diagram shows data transmitted between a network appliance 230, a service provider 240 and a content provider server 250, in accordance with another embodiment of the invention. In a first transmission 252, a signing server 242 of the service provider 240 sends an identity certificate to the network appliance 230. The network appliance 230 stores the identity certificate locally and initiates a second transmission 254 to establish a secure connection with a back-end server 244 of the service provider 240 to obtain configuration information from the back-end server 244. The back-end server 244 may be accessible directly or via an https proxy (not shown). The back-end server 244 or the https proxy authenticates the network appliance 230 using its certificate.

If the authentication fails, the network appliance 230 is notified about the failure via an error response 256. The network appliance 200 then determines whether a possible cause of the failure is incorrect time of the network appliance 230. In particular, the network appliance 230 sends http HEAD requests to one or more predefined content provider servers 250, and receives responses from the servers 250. The network appliance 230 extracts time data from the header of each response, calculates an average time value based on the extracted time data, and compares the time of the network appliance 230 with the calculated time value. If the difference between the two times is significant (e.g., exceeds a predefined threshold), the network appliance 230 resets its time using the calculated time value. Subsequently, the network appliance 230 communicates with a time server (not shown) of the service provider 240 to obtain the exact time, as discussed above in conjunction with FIG. 2A.

It should be noted that transmissions 254 through 260 may be repeated each time the network appliance 230 attempts to establish a secure connection with the service provider 240 or any other entity that trusts the signing server 242.

Figure 3:
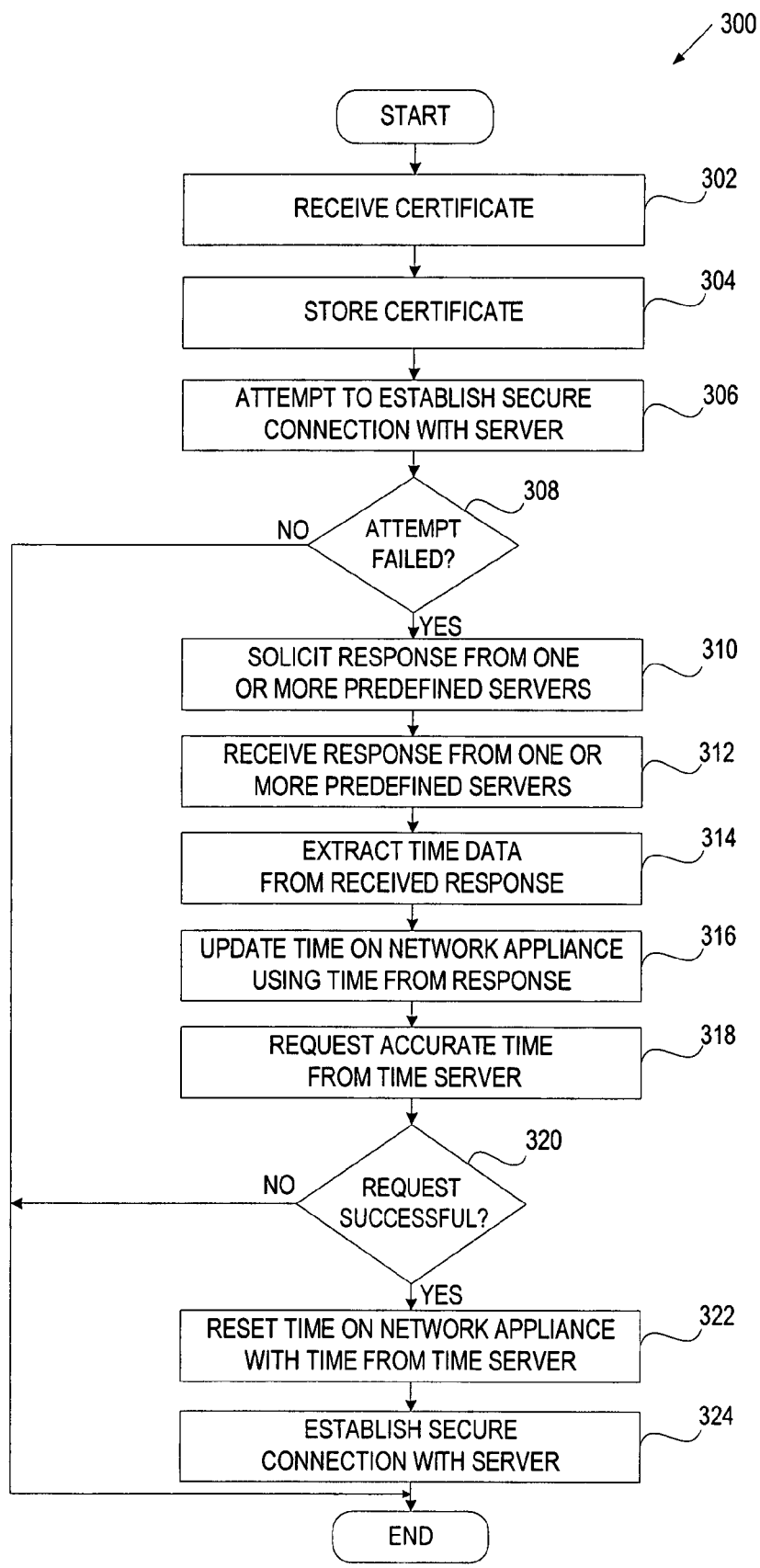
FIG. 3 is a flow diagram of one embodiment of a method for setting time on a network appliance based on a response received from one or more servers.

FIG. 3 is a flow diagram illustrating one embodiment of a method 300 for setting time on a network appliance based on a response received from a server. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a network appliance, such as a network appliance 102 of FIG. 1.

Referring to FIG. 3, method 300 begins with processing logic receiving an identity certificate issued for a network appliance by a certificate authority (e.g., a signing server of a service provider) (block 302). At block 304, processing logic stores the identity certificate in a local data storage. Processing logic then uses the identity certificate each time the identity certificate is needed for a certain operation of the network appliance. For example, processing logic may use the identity certificate each time it attempts to establish a secure connection with an entity trusting the certificate authority.

At block 306, processing logic attempts to establish a secure connection with a server or proxy that trusts the certificate authority. At block 308, processing logic determines whether the attempt to establish a secure connection has failed. If not, method 300 ends. If so, processing logic proceeds to block 310 where it solicits a response from one or more predefined servers. The predefined servers may be represented by an application server (e.g., a certificate status server) as will be discussed in more detail below in conjunction with FIG. 4A. Alternatively, the predefined servers may be content provider servers such as Yahoo!, Google, eBay, etc., as will be discussed in more detail below in conjunction with FIG. 4B.

At block 312, processing logic receives a response(s) from one or more predefined servers. At block 314, processing logic extracts time data from the received response(s). At block 316, processing logic updates the time on the network appliance using the extracted time data.

At block 316, processing logic requests current time from a time server. If the request is successful (block 320), processing logic resets the time of the network appliance with the current time provided by the time server (block 322), and repeats its attempt to establish a secure connection with the server or proxy (block 324).

If the request sent at block 318 is unsuccessful, processing logic may decide that the likely cause of the request failure is a network problem, and resubmit the request later.

Figure 4A:
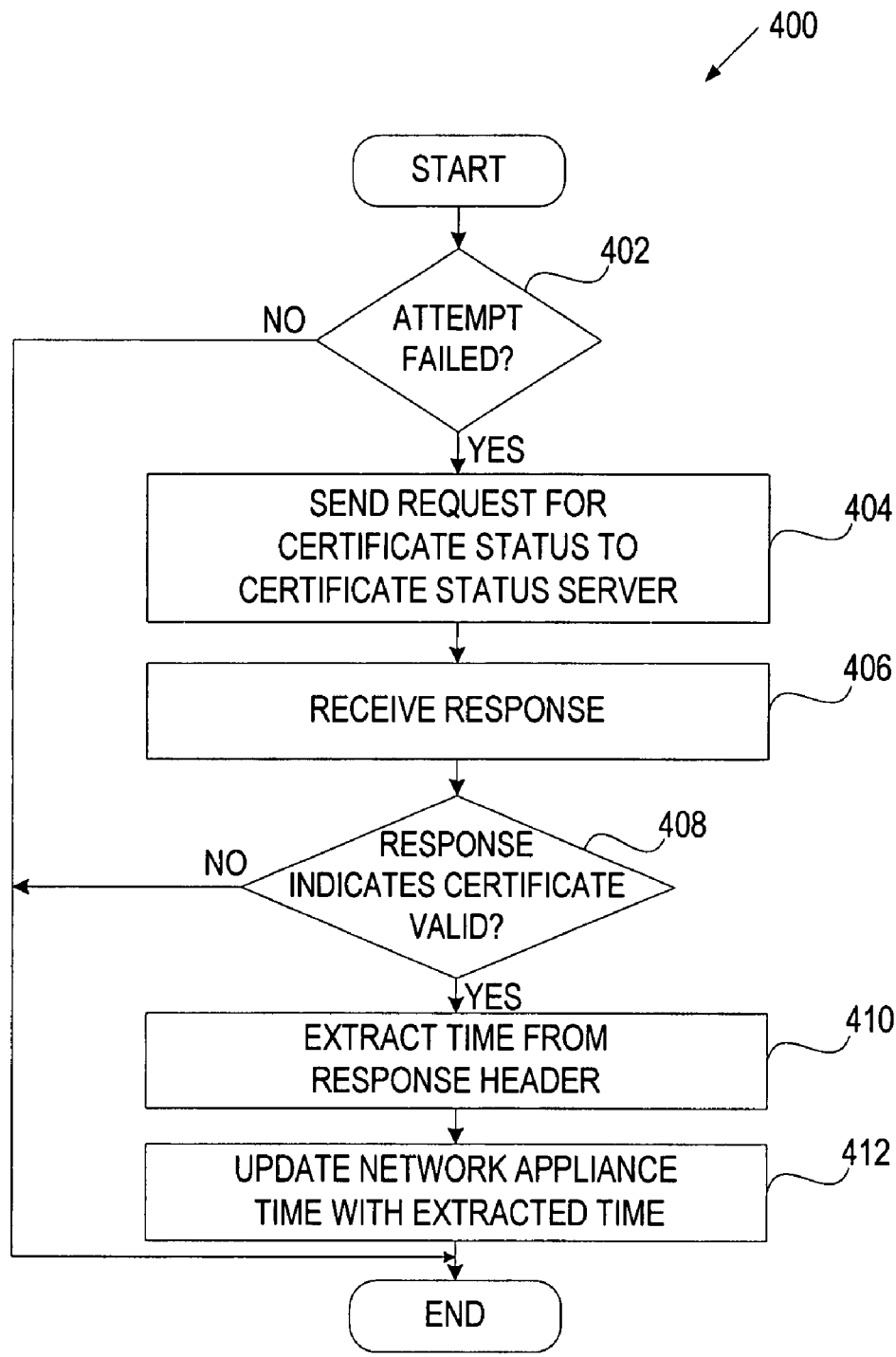
FIG. 4A is a flow diagram of one embodiment of a method for obtaining time data to correct the time on a network appliance using a response received from a certificate status server.
Figure 4B:
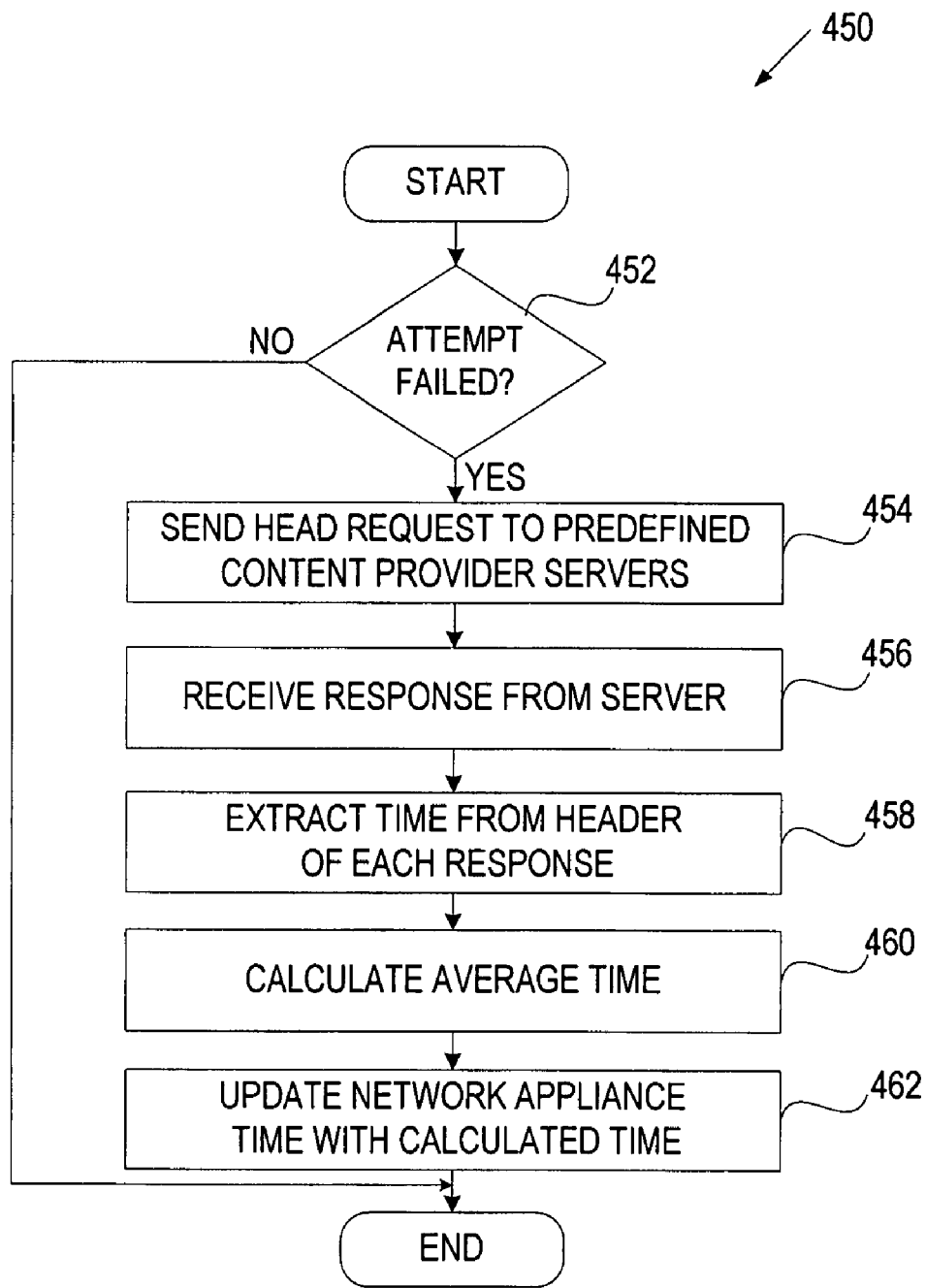
FIG. 4B is a flow diagram of one embodiment of a method for obtaining time data to correct the time on a network appliance using responses received from content provider servers.

FIGS. 4A and 4B are flow diagrams of two embodiments of a method for obtaining time data to correct the time on a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a network appliance such as a network appliance 102 of FIG. 1.

Referring to FIG. 4A, method 400 begins with processing logic determining whether an attempt to establish a secure connection with a backend server has failed. If not, method 400 ends. If so, processing logic proceeds to block 404 where it sends a request for a certificate status to a certificate status server (block 404).

At block 406, processing logic receives a response from the certificate status server. At block 408, processing logic determines whether the certificate is valid. If not, method 400 ends. If so, processing logic extracts time data from the received response (block 410), and updates the time on the network appliance with the extracted time data.

Referring to FIG. 4B, method 450 begins with processing logic determining whether an attempt to establish a secure connection with a backend server has failed. If not, method 450 ends. If so, processing logic proceeds to block 454 where it sends an http HEAD request to a set of predefined content provider servers.

At block 456, processing logic receives responses from the predefined servers. At block 458, processing logic extracts time data from each received response. At block 460, processing logic calculates an average time value based on the extracted time data. At block 462, processing logic updates the time on the network appliance with the average time value.

Figure 5:
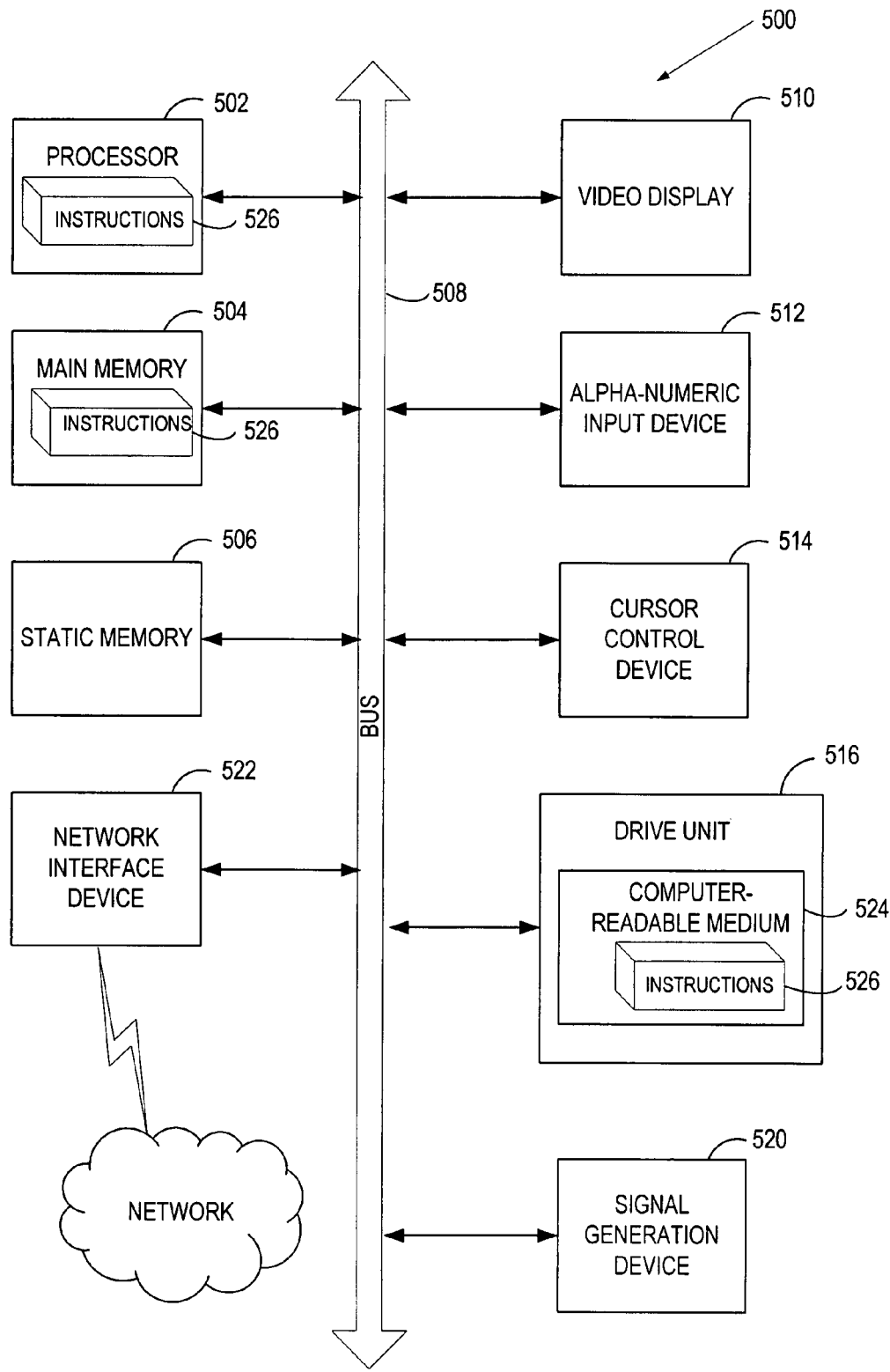
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 10, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alpha-numeric input device (e.g., a keyboard), and/or a cursor control device (e.g., a mouse).

The computer system 500 may or may not include a secondary memory 518 (e.g., a data storage device) having a machine-readable storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   requesting, by a network appliance, a response from one or more predefined servers via a network, the one or more predefined servers comprising a certificate status server and one or more content provider servers;
   upon receiving, by the network appliance, the response from the one or more predefined servers, extracting, by the network appliance, header time data from the received response;
   updating, by the network appliance, a current time on the network appliance to a preliminary time value using the header time data; and
   connecting, by the network appliance, to a time server using the preliminary time value and requesting a new time value from the time server.

2. The method of claim 1 further comprising:
   receiving a certificate from a signing server; and
   storing the certificate in a local store on the network appliance.

3. The method of claim 1 wherein requesting the response from one or more predefined servers comprises:
   sending a request for a certificate status to the certificate status server.

4. The method of claim 1 wherein requesting the response from one or more predefined servers comprises:
   sending a HEAD request to the one or more content provider servers.

5. The method of claim 2 further comprising:
   making an attempt to establish a secure connection with a backend server using the certificate.

6. The method of claim 5 wherein requesting the new time value from the time server comprises:
   sending a request with the certificate to an https proxy associated with the time server; and
   if the request is successful, receiving a response including the new time value from the time server.

7. The method of claim 6 further comprising:
   if the request is unsuccessful, receiving an error message indicating that an authentication of the network appliance by the https server has failed;
   determining an adjusted time data;
   resetting the time on the network appliance using the adjusted time data; and
   resubmitting a request for a new time value to the time server.

8. The method of claim 7 wherein determining the adjusted time data comprises:
   incrementing the header time data by a predefined time value.

9. A non-transitory machine-readable medium including instructions that, when executed by a network appliance, cause the network appliance to perform a computer implemented method comprising:
   requesting, by a network appliance, a response from one or more predefined servers via a network, the one or more predefined servers comprising a certificate status server and one or more content provider servers;
   upon receiving, by the network appliance, the response from the one or more predefined servers, extracting, by the network appliance, header time data from the received response;
   updating, by the network appliance, a current time on the network appliance to a preliminary time value using the header time data; and
   connecting, by the network appliance, to a time server using the preliminary time value and requesting a new time value from the time server.

10. The non-transitory machine-readable medium of claim 9 wherein the method further comprises:
    receiving the certificate from a signing server; and
    storing the certificate in a local store on the network appliance.

11. The non-transitory machine-readable medium of claim 9 wherein requesting the response from one or more predefined servers comprises:
    sending a request for a certificate status to the certificate status server.

12. The non-transitory machine-readable medium of claim 9 wherein requesting the response from one or more predefined servers comprises:
    sending a HEAD request to the one or more content provider servers.

13. The non-transitory machine-readable medium of claim 10 wherein the method further comprises:
    making an attempt to establish a secure connection with a backend server using the certificate.

14. The non-transitory machine-readable medium of claim 13 wherein requesting the new time value from the time server comprises:
    sending a request with the certificate to an https proxy associated with the time server; and
    if the request is successful, receiving a response including the new time value from the time server.

15. The non-transitory machine-readable medium of claim 14 wherein the method further comprises:
    if the request is unsuccessful, receiving an error message indicating that an authentication of the network appliance by the https server has failed;
    determining an adjusted time data;
    resetting the time on the network appliance using the adjusted time data; and
    resubmitting a request for a new time value to the time server.

16. The non-transitory machine-readable medium of claim 15 wherein determining the adjusted time data comprises:
    incrementing the header time data by a predefined time value.

17. A network appliance computing system, comprising:
    a data store to store a certificate issued for a network appliance; and
    a time resetting module, coupled to the data store, to determine that an attempt to establish a secure connection between the network appliance and a backend server using the certificate via a network has failed, to request a response from one or more predefined servers via the network, the one or more predefined servers comprising a certificate status server and one or more content provider servers, to receive the response from the one or more predefined servers, to extract header time data from the received response, to update a current time on the network appliance using the header time data, and to connect to the time server using the preliminary time value and to request a new time value from the time server.

18. The system of claim 17 wherein the time resetting module is to request the response from one or more predefined servers by sending a request for a certificate status to the certificate status server.

19. The system of claim 17 wherein the time resetting module is to request the response from one or more predefined servers by sending a HEAD request to the one or more content providers servers.

20. The system of claim 17 wherein the time resetting module is further to
make a new attempt to establish the secure connection with the backend server.

21. The system of claim 17 wherein the time resetting module is to request the new time value from the time server by:
sending a request with the certificate to an https proxy associated with the time server; and
if the request is successful, receiving a response including an accurate the new time value from the time server.

22. The system of claim 21 wherein the time resetting module is further to:
receive, if the request is unsuccessful, an error message indicating that an authentication of the network appliance by the https server has failed;
determine an adjusted time data;
reset the time on the network appliance using the adjusted time data; and
resubmit a request for a new time value to the time server.

23. The system of claim 22 wherein the time resetting module is to determine the adjusted time data by incrementing the header time data by a predefined time value.

* * * * *